(12) United States Patent
Maatta et al.

(10) Patent No.: US 9,120,187 B2
(45) Date of Patent: Sep. 1, 2015

(54) MULTILAYER 3D GLASS WINDOW WITH EMBEDDED FUNCTIONS

(75) Inventors: Esa-Sakari Maatta, Espoo (FI); Harri A. Lasarov, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 341 days.

(21) Appl. No.: 13/491,772

(22) Filed: Jun. 8, 2012

(65) Prior Publication Data

US 2013/0330495 A1  Dec. 12, 2013

(51) Int. Cl.
| | |
|---|---|
| B32B 17/00 | (2006.01) |
| B23P 11/00 | (2006.01) |
| B32B 38/18 | (2006.01) |
| G06F 1/16 | (2006.01) |
| G06F 3/041 | (2006.01) |
| B32B 7/12 | (2006.01) |
| B32B 17/06 | (2006.01) |
| B32B 1/00 | (2006.01) |
| B32B 37/12 | (2006.01) |

(52) U.S. Cl.
CPC . B23P 11/00 (2013.01); B32B 1/00 (2013.01); B32B 7/12 (2013.01); B32B 17/064 (2013.01); B32B 38/1866 (2013.01); G06F 1/1637 (2013.01); G06F 1/1643 (2013.01); G06F 3/041 (2013.01); G06F 3/0412 (2013.01); B32B 2037/1253 (2013.01); B32B 2307/412 (2013.01); B32B 2457/208 (2013.01); Y10T 29/49826 (2015.01); Y10T 156/1044 (2015.01); Y10T 428/23 (2015.01); Y10T 428/24008 (2015.01); Y10T 428/24322 (2015.01)

(58) Field of Classification Search
CPC ...... B32B 17/00; B32B 3/10; B32B 38/1866; G06F 3/0412; Y10T 428/23; Y10T 428/24008
USPC .................................. 428/68, 99, 137, 426
See application file for complete search history.

(56) References Cited

U.S. PATENT DOCUMENTS

| | | | | |
|---|---|---|---|---|
| 5,494,546 A | * | 2/1996 | Horvath | 156/102 |
| 6,492,008 B1 | * | 12/2002 | Amagi et al. | 428/209 |
| 2011/0267298 A1 | * | 11/2011 | Erhart et al. | 345/173 |

OTHER PUBLICATIONS

"Atomic Layer Deposition", Beneq, 2012 (2 pages).
"Parc, Thinfilm unveil first printed, flexible CMOS computer circuit", Sebastian Anthony, Oct. 26, 2011 (3 pages).
"Printed Electronics", NanoPrint Technologies, 2012 (1 page).
"Tokyo University creates flexible organic flash memory", Matthew Humphries, Dec. 16, 2009 (5 pages).
"Printed Resistors", Würth Elektronik GmbH & Co, 2012 (1 pages).

* cited by examiner

*Primary Examiner* — Brent O'Hern
(74) *Attorney, Agent, or Firm* — Harrington & Smith

(57) ABSTRACT

A method for the manufacturing of thin 3D glass window is described. The method includes layering a plurality of thin films. The plurality of thin films includes at least one glass film. The method also includes molding the plurality of thin films to form a three dimensional shape and laminating the plurality of thin films in the three dimensional shape. The 3D glass window and apparatus including the 3D glass window are also described.

19 Claims, 13 Drawing Sheets

MULTILAYER 3D GLASS WINDOW WITH EMBEDDED FUNCTIONS

TECHNICAL FIELD

The exemplary and non-limiting embodiments relate generally to multilayered glass and, more specifically, relate to manufacturing of thin 3D glass windows.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

ACF anisotropic conductive film
ALD atomic layer deposition
AR anti-reflective
E2C easy to clean
IMD in-mold decorating
IML in-mold labeling
ITO indium tin oxide
OCA optically clear adhesive
OLED organic light emitting diode
PET polyethylene terephthalate
PUR polyurethane reactive
UE user equipment, such as a mobile station or mobile terminal
UV ultraviolet Many devices feature glass screen (or windows). While mobile devices are designed in a great many forms, the limitations of glass screens limit the options available. For example, a glass screen which is flat (or two dimensional, 2D) causes the mobile device to present at least that portion of the device as a flat surface. Also, conventional glass screens, especially those that are curved in the front and flat on the backside, tend to be thick (for example, over 1.5 mm). This adds additional weight and size to the mobile device.

While a glass screen may be molded into a three dimensional (3D) shape, this introduces potential hurdles in the manufacturing process. A 3D shape is a non-flat shape where the surface of the shape is not a plane, such as a bent shape or wavy shape for example. A glass screen which is molded, for example, using thermoforming, may have distortions in the glass material. Such a screen is inadequate for many mobile device uses. This also lowers the yield of the molding process as many screens are unusable.

Once an adequate glass screen is molded, there remain additional problems of processing the 3D glass screen. For example, adding a touch-sensor to a 2D glass screen is well understood; however, adding the touch-sensor to a glass screen which includes a curve (or other 3D elements) is not so straight forward. Additionally, current molding techniques for glass screens such as thermoforming make adding functional elements (such as a touch sensor) to the glass screen prior to molding impractical.

What is needed is a technique to make thin 3D glass screens.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method for the manufacturing of thin 3D glass window. The method includes layering a plurality of thin films. The plurality of thin films includes at least one glass film. The method also includes molding the plurality of thin films to form a three dimensional shape and laminating the plurality of thin films in the three dimensional shape.

In another aspect thereof an exemplary embodiment provides an apparatus including a thin 3D glass window. The apparatus includes a laminated plurality of thin films. The laminated plurality of thin films includes at least one glass film. The laminated plurality of thin films has a three dimensional form.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

Figure 1:
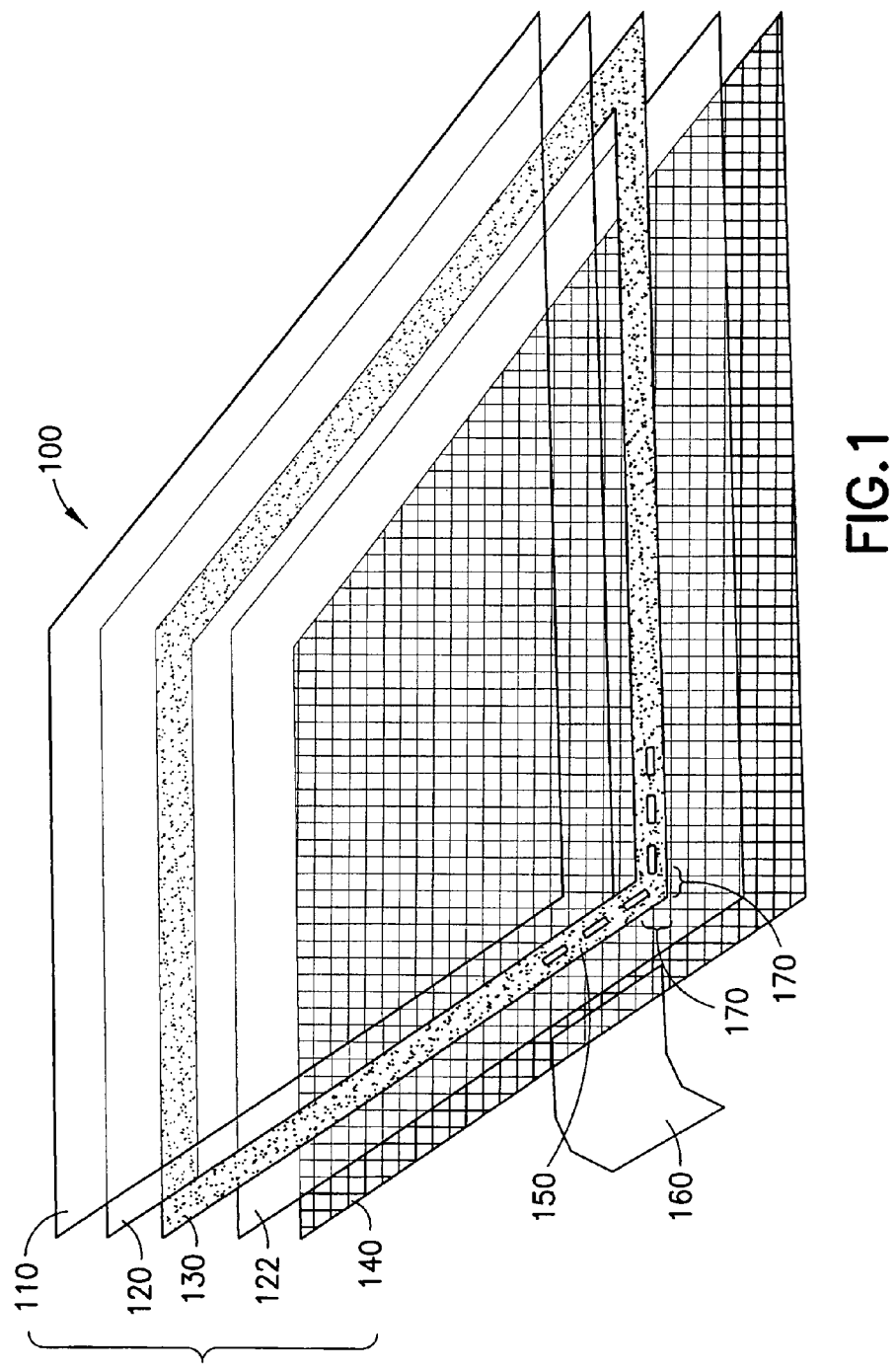
FIG. 1 illustrates an exploded view of a multilayer structure in accordance with an exemplary embodiment.

FIG. 1 illustrates an exploded view of a multilayer structure 100 in accordance with an exemplary embodiment. As shown, the multilayer structure (or stack) 100 includes a film (or layer) of toughened glass 110. The toughened glass 110 is an outer film of the structure 100; as one side is exposed. That is, the toughened glass 110 is not an interior film which is sandwiched between two other films. The toughened glass 110 is stacked on top of a first film of optically clear adhesive (OCA) 120. However, use of toughened glass is not limited to the top layer only.

On the other side of the OCA 120 is a film of printed glass 130. The printed glass 130 includes a printed antenna 150. The printed antenna 150 is located near an edge of the printed glass 130 in a printed margin 170. The printed glass 130 is stacked on top of a second film of OCA 122.

On the bottom of the multilayer structure 100 is a touch element sputtered glass 140. This is a layer of glass which has an integrated a touch element (for example, a touch element printed on one side of the layer). The touch element sputtered glass 140 includes an ACF bonded flexible connector (or flexi) 160. The flexi 160 may be used as an electrical connector between the touch element and other devices, such as, a processor (not shown), for example.

Figure 2:
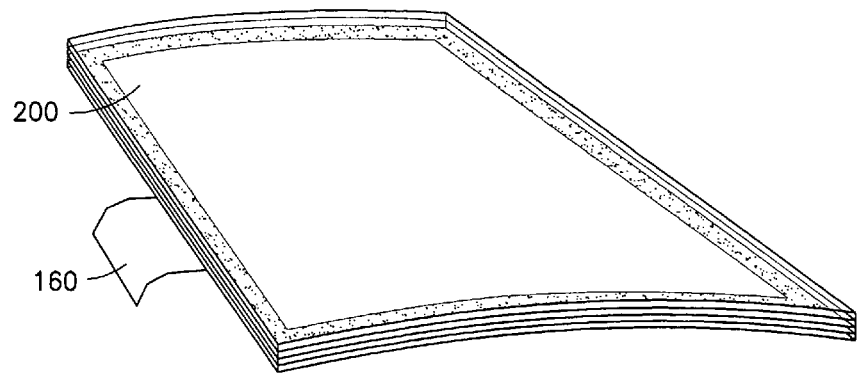
FIG. 2 illustrates a view of the multilayer structure shown in FIG. 1 after lamination.

FIG. 2 illustrates a view of the multilayer structure 100 shown in. FIG. 1 as assembled and after lamination. As shown, the various films (110, 120, 130, 122, 140) have been laminated into a 3D shape to create glass window 200. The 3D shape is realized in a slight curving of the glass window 200 such that the glass window 200 is non-planar. The flexi 160 can be seen extending beyond the edge of the glass window 200.

The OCA layers 120, 122 can be tailored to be relatively soft so that different layers 110, 130, 140 can slide in relation to each other. This sliding allows the stack to have a degree of flexible which helps in keeping the window unbroken when the device drops on the floor. A thick glass window is solid and rigid. Thus, the 3D window stack can withstand drops which would otherwise break a thick glass window. The flexibility is especially useful in over molding the 3D window with polymers in an injection molding process in order to create an integrated window-housing unit.

As discussed above, various exemplary embodiments provide a 3D glass window which is thinner than conventional solid glass windows. Some OLED displays can be manufactured which are 0.3 mm thick and include no plastic. However, such a display needs to be protected with a glass window if used in a touch phone. In contrast, when the display is laminated from thin, flexible glass sheets such as shown in FIGS. 1 and 2, a separate protective window becomes obsolete as the display can be embedded into the glass window stack which can also have other embedded functional elements.

Figure 16:
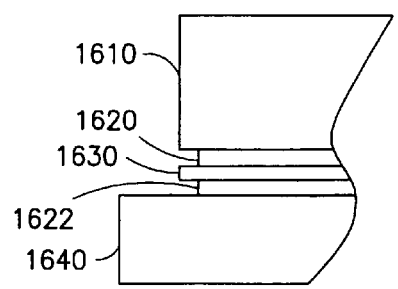
FIG. 16 is a simplified block diagram of various layers in a conventional window.
Figure 17:
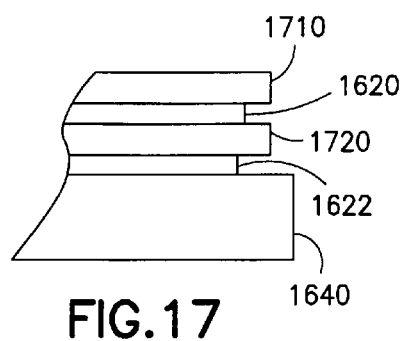
FIG. 17 is a simplified block diagram of various layers in accordance with an exemplary embodiment.

FIGS. 16 and 17 provide examples of glass windows for comparison. FIG. 16 is a simplified block diagram of various layers in a conventional window. FIG. 17 is a simplified block diagram of various layers in accordance with an exemplary embodiment.

For the conventional glass window show in FIG. 16, the 3D glass window 1610 has a thickness of 0.8 mm. Three other layers each have a thickness of 0.1 mm—a first OCA layer 1620, an anti-splinter film (or touch element on a polyethylene terephthalate (PET) film) 1630 and a second OCA layer 1622. These layers make a stack of thickness 1.1 mm which is layered on a flexible display 1640.

For the exemplary embodiment shown in FIG. 17, on the other hand, using thin, flexible glass, the glass window 1710 is kept to a thickness of 0.2 mm (or even 0.1 mm). As in FIG. 16, the first OCA layer 1620 and the second OCA layer 1622 are both 0.1 mm thick. A glass layer 1720 which has a touch element) is also 0.1 mm thick. This provides a stack of total thickness of 0.6 mm, which is nearly half the thickness of the layers in FIG. 16.

As described above, various exemplary embodiments provide a 3D glass stack 100 which is formed using multiple layers of thin glass film (110, 130, 140). The 3D glass stack 100, being made of glass, provides an improved scratch resistance compared to hard coated plastic windows and also enjoys the premium high gloss look and feel of real glass. Since functional elements may be embedded in the layers of the stack (140, 150), this allows various components to be moved further from other parts of a device. For example, antennas and sensors are further from inner metal components which may cause interference. Also, the embedded components have better dust and moisture protection.

The 3D glass stack also provides new possibilities to fix the 3D glass stack to device mechanics. As a non-limiting example, the fixing features may include a wide plastic sheet is laminated as a part of the multilayer stack. The 3D glass stack can be securely fastened to the device mechanics using the wide plastic sheet.

Figure 3:
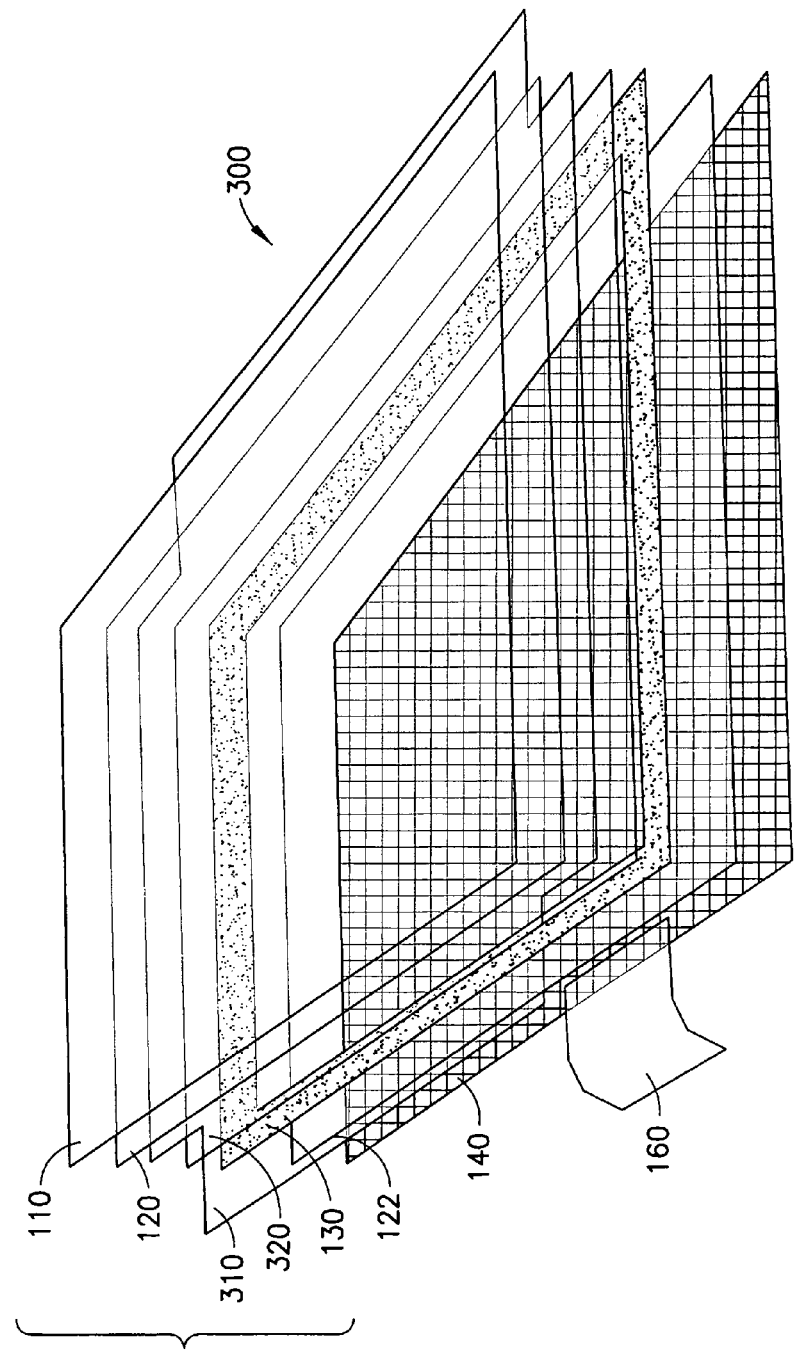
FIG. 3 illustrates an exploded view of a second multilayer structure in accordance with an exemplary embodiment.

FIG. 3 illustrates an exploded view of a second multilayer structure 300 in accordance with an exemplary embodiment. Similar to the multilayer structure 100 of FIG. 1, the second multilayer structure 300 includes layers of toughened glass 110, OCA 120, printed glass 130, OCA 122 and touch element sputtered glass 140 (with flexi 160). The second multilayer structure 300 additionally includes a plastic film 310 and a third OCA 320. As a non-limiting example, the plastic film 310 is shaped to extend beyond the edge of the other layers in the stack 300 on two sides.

Figure 4:
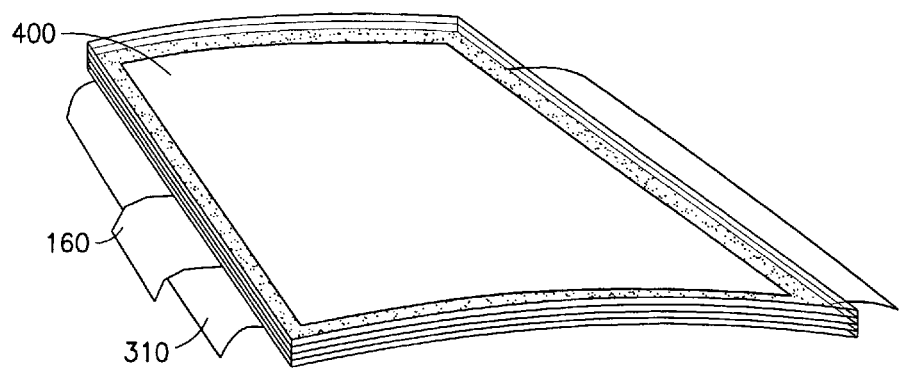
FIG. 4 illustrates a view of the second multilayer structure shown in FIG. 3 after lamination.

FIG. 4 illustrates a view of the second multilayer structure 300 shown in FIG. 3 after assembly and lamination. As shown, the various films (110, 120, 310, 320, 130, 122, 140) have been laminated into a 3D shape to create glass window 400. As with glass window 200, the 3D shape is a slight curving of the glass window 400. The both the plastic film 310 and flexi 160 extends beyond the edge of the glass window 400.

Figure 5:
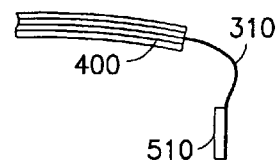
FIG. 5 demonstrates how a plastic sheet of the second multilayer structure shown in FIGS. 3 and 4 may be used to affix the second multilayer structure.

FIG. 5 demonstrates how a plastic sheet 310 of the second multilayer structure 400 shown in FIGS. 3 and 4 may be used to affix the second multilayer structure 400. For example, a 2-sided adhesive 510 may be adhered to the portion of the plastic film 310 which extends beyond the edge of glass window 400. As shown below, the 2-sided adhesive 510 may be used to attach the glass window 400 to another device/object (such as a chassis, frame, etc.).

The stack of thin glass films and additional material sheets (such as OCA, etc.) may be placed on a curved lamination jig. Layer by layer the different sheets are laminated together into the 3D shape of the jig. In this process, the glass bends into the shape due to the thickness of the glass. Since the glass is very thin (0.05 mm-0.2 mm) it is easy to bend. In further non-limiting examples, the glass stack can be laminated directly on a structural part of a mobile device and/or a display, such as an organic light emitting diode (OLED) for example, may be integrated into the glass layers.

The layers may be of equal thickness or the layers may have different thickness. A smaller layer size inside the stack provides more space and thus can help in integrating components between the layers. Additionally, the layers may be sized so that the stack, when in the 3D shape has relatively even sides. For example, a layer on the outer side of the bend may be long Additionally, the length of the layer may be of equal sizes or the layers may be differently sized. For example, a layer on the outer side of the bend (farther from the vertex of the bend) may be longer than a layer on the interior side of the bend (closer to the vertex of the bend).

Figure 6:
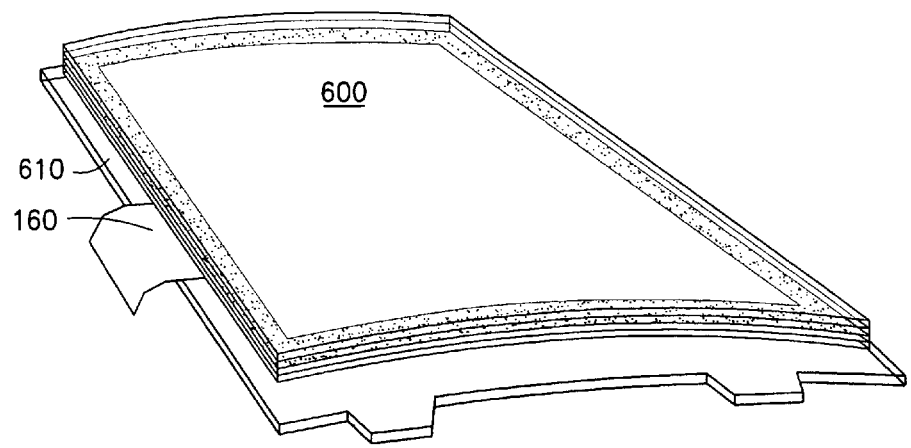
FIG. 6 illustrates a view of a third multilayer structure in accordance with an exemplary embodiment.

FIG. 6 illustrates a view of a third multilayer structure 600 in accordance with an exemplary embodiment. The multilayer structure 600 is shown layered on a molded part 610. The molded part 610 has a 3D shape which the multilayer structure 600 substantially duplicates. The multilayer structure 600 may be laminated while layered on the molded part 610. The 3D shape of multilayer structure 600 will then be set and the multilayer structure 600 stays on the molded part 610 which is intended to be used in assembling the window to device housing. This implementation is illustrated in FIGS. 7-10.

As described above, the 3D glass window stack may include a plastic sheet. As discussed above regarding the glass layers, the plastic sheet can be used to include functional elements such as a decoration, for example. The plastic sheet may also include elements which assist in connecting the glass window stack to other devices. For example, snap connectors (or snappers) may be embodied in the plastic sheet. Other fasteners may also be used, for example a screw boss.

Additionally, various layers in the 3D glass window stack may include holes and/or gaps. These holes allow access to other layers in the stack. As one non-limiting example, the stack may include a hole which allows physical access to a printed antenna pattern.

Figure 7:
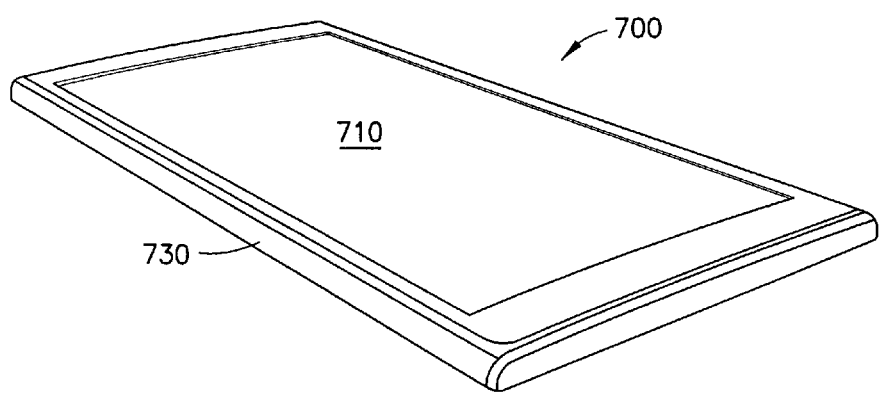
FIG. 7 shows a mobile device cover in accordance with an exemplary embodiment in accordance with an exemplary embodiment.

FIG. 7 shows a mobile device cover 700 in accordance with an exemplary embodiment. The cover 700 may be used as part of a mobile phone for example. The cover 700 includes a fourth multilayer structure 710 attached to a housing 720.

Figure 8:
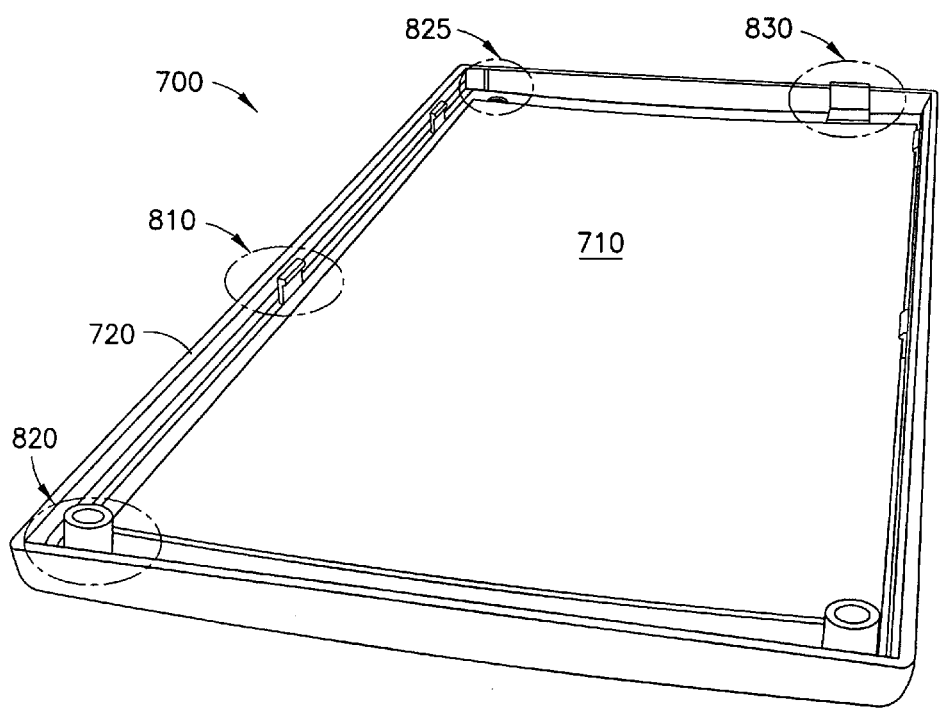
FIG. 8 shows a rotated view of the mobile device cover of FIG. 7.

FIG. 8 shows a rotated view of the mobile device cover of FIG. 7. The rotated view shows the interior side of the cover 700. The multilayer structure 710 is shown with a flexi 830 and additional features. The additional features include screw bosses 820, holes 825 and snappers 810 integrally formed with the housing 720.

Figure 9:
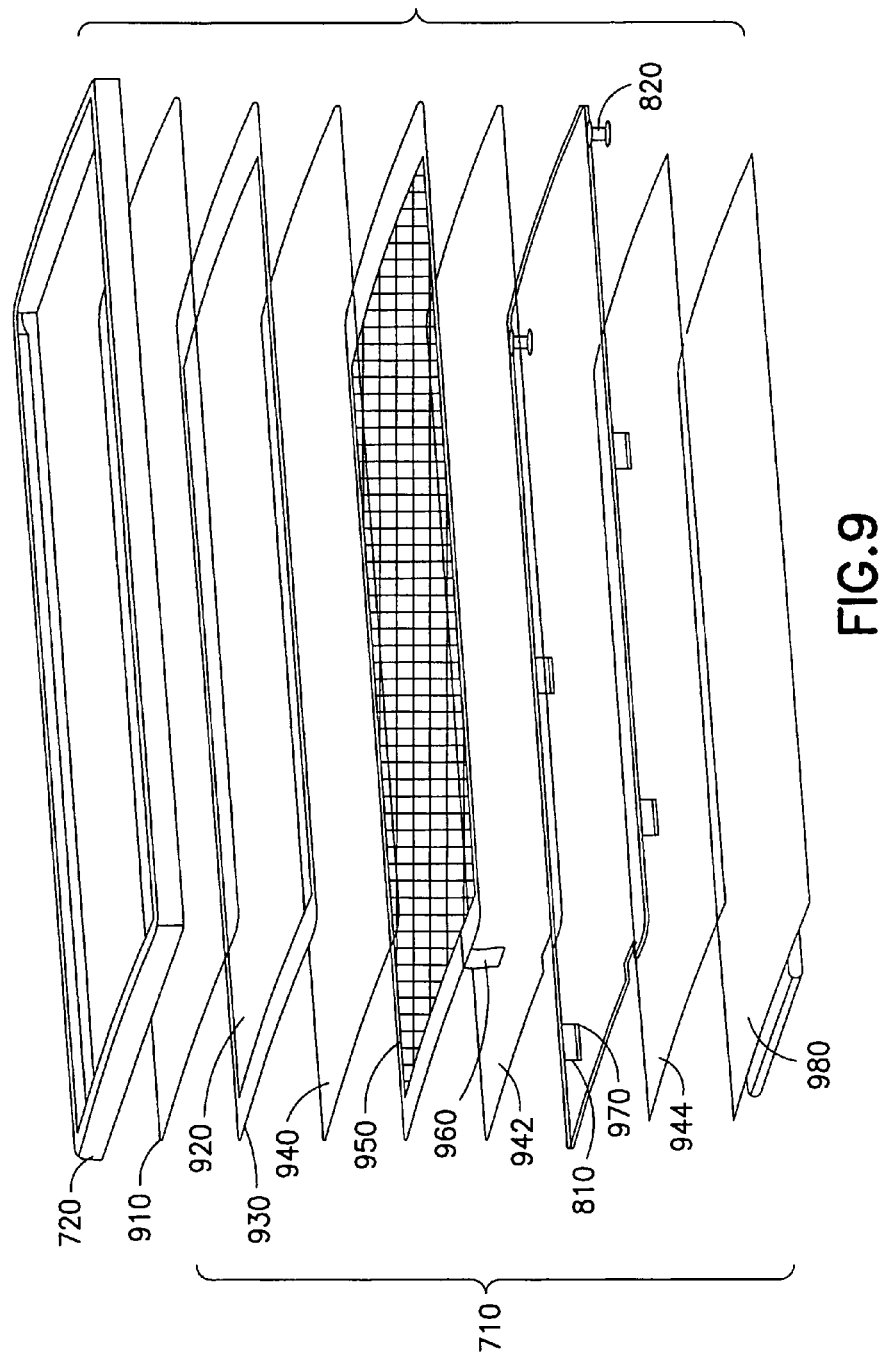
FIG. 9 illustrates an exploded view of the mobile device cover of FIG. 7.

FIG. 9 illustrates an exploded view of the mobile device cover 700 of FIG. 7. The mobile device cover 700 includes a glue strip 910 between housing 720 and multilayer structure 710. The glue strip 910 is a thin ring on the edge of the multilayer structure 710 which is covered by the housing 720.

The glass window 920 of multilayer structure 710 features a black frame decoration and an integrated antenna 930. An OCA 940 is layered between glass window 920 and glass layer 950. Glass layer 950 features an integrated ITO touch element and a flexi 960.

The multilayer structure 710 also includes a second OCA 942 and a plastic frame 970. The plastic frame 970 extends beyond the edges of other layers in the multilayer structure 710. The extend portion of plastic frame 970 includes snappers 810 and screw bosses 820.

A display module 980 is part of the multilayer structure 710 and is connected to the plastic frame 970 by a third OCA 944.

The glass window 920, OCA 940, glass layer 950, OCA 942 and a plastic frame 970 may be set in a 3D shape prior to being attached to the display module 980 and housing 720.

Embedded electrical components may be implemented using printing, laminating, gluing etc. In practice, thin electrical components may be selected in order to keep the total thickness of the integrated 3D window down. The electrical components which may be embedded include capacitive sensors, antenna patterns, semiconductors, CMOS computer circuits, resistors (such as those printed in ink form), etc. Printed components may provide memory applications, processing functions, signal detection, etc.

The 3D glass window may be added to a final product, such as to form a mobile device for example. The embedded electrical components may be connected to other elements of the mobile device using various connection technologies. For example, the antenna can be connected using a pogo pin, a spring clip, soldered coaxial cable on the antenna pattern, a flexi tail coming from the antenna pattern, etc. In one non-limiting example, the embedded antenna can be coupled inductively to other components of the mobile device. A functional element within the stack may be connected electrically with a spring clip, pogo pin, inductive connection or soldered cable. An embedded flexi may be directly connected using a connector to device electronics. In a non-limiting example, the embedded functional element may be connected inductively to the device electronics.

Figure 10:
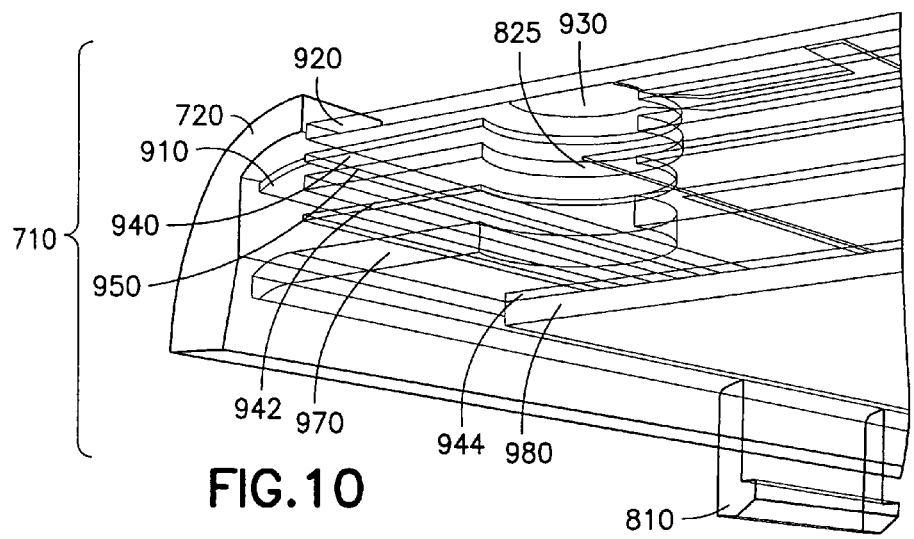
FIG. 10 illustrates a cut-away view of the mobile device cover of FIG. 7.

FIG. 10 illustrates a cut-away and exploded view of the mobile device cover 700 of FIG. 7. This view is focused on the far left corner shown in FIG. 8 which features hole 825. As shown, the hole 825 is in OCA 940, glass layer 950, OCA 942 and a plastic frame 970. Also, display module 980 and OCA 944 do not extend over the hole 825. The hole 825 is positioned over the integrated antenna 930 on glass window 920. This allows access to the integrated antenna 930.

Figure 11:
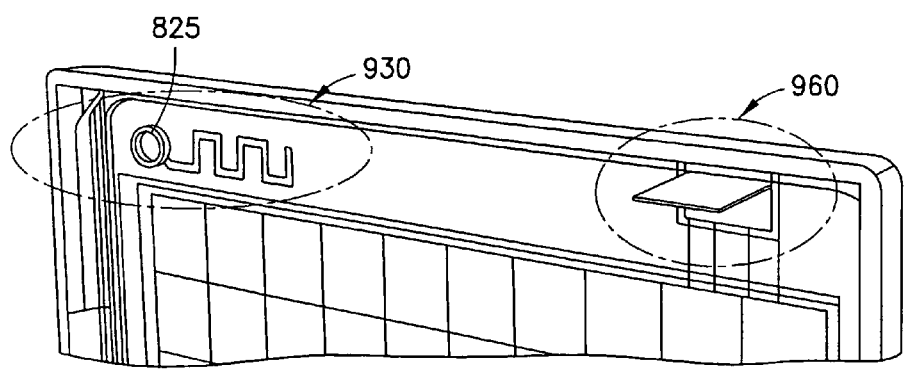
FIG. 11 shows a zoomed-in view of the mobile device cover of FIG. 7.

FIG. 11 shows a zoomed-in view of the mobile device cover 700 of FIG. 7. This image provides a close-up view of the hole 825 over the integrated antenna 930 and a close-up view of the flexi 960.

Figure 12:
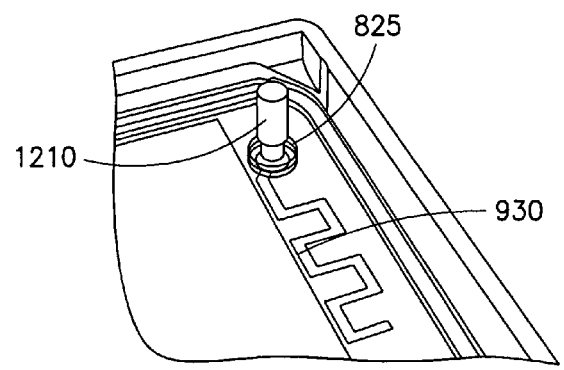
FIG. 12 shows a second zoomed-in view of the mobile device cover of FIG. 7.

FIG. 12 shows a second zoomed-in view of the mobile device cover 700 of FIG. 7. As shown, an antenna 1210 is positioned in the hole 825 so as to connect with the integrated antenna 930.

Figure 13:
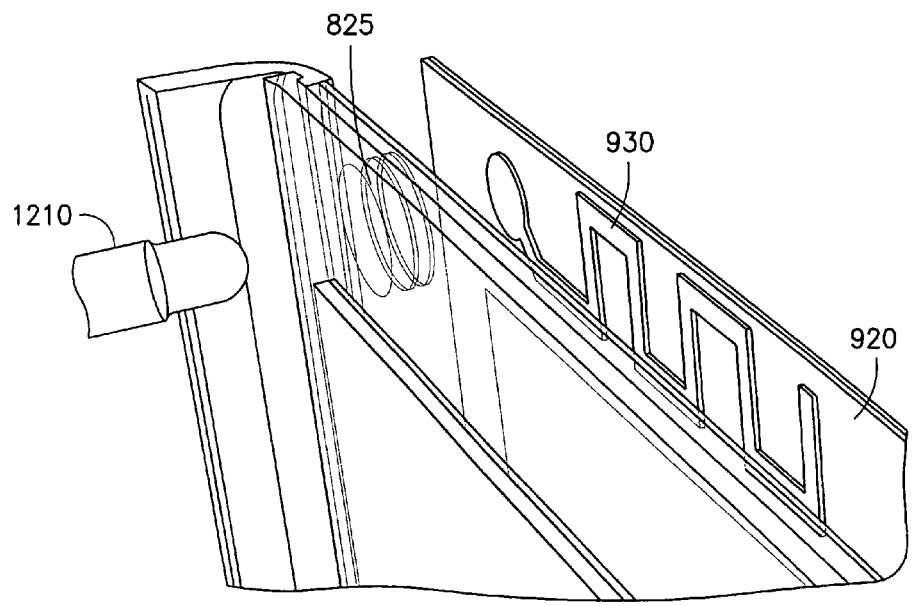
FIG. 13 illustrates another exploded view of the mobile device cover of FIG. 7.

FIG. 13 illustrates another exploded view of the mobile device cover 700 of FIG. 7. The integrated antenna 930 is printed (or glued) to the back face of the glass window 920. Antenna 1210 may be connected electrically by making direct, physical contact with integrated antenna 930. Alternatively, antenna 1210 may be inductively coupled to the integrated antenna 930.

Figure 14:
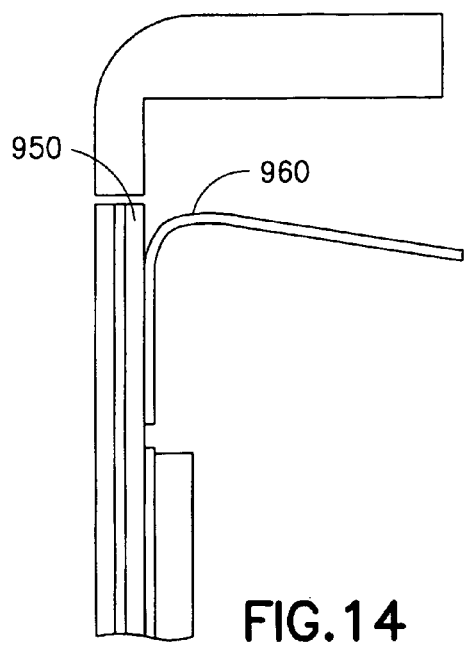
FIG. 14 demonstrates a cross section of the mobile device cover of FIG. 7.
Figure 15:
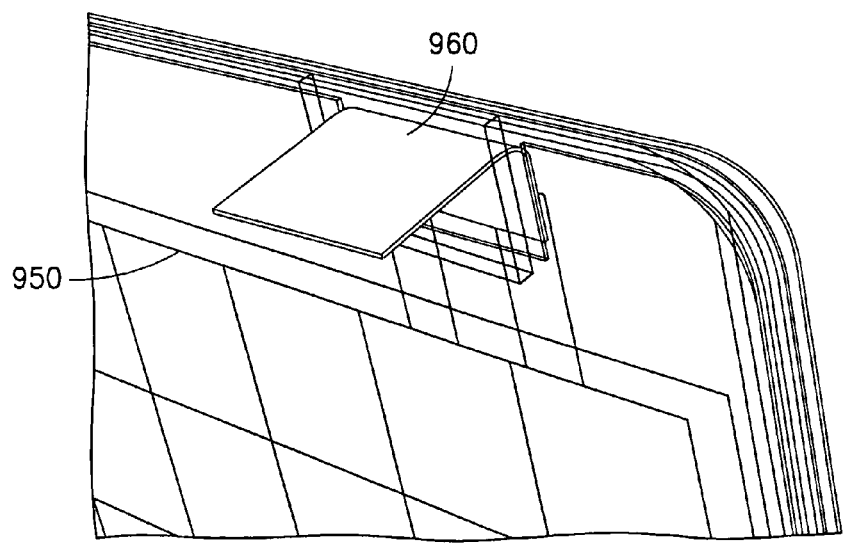
FIG. 15 shows a third zoomed-in view of the fourth multilayer structure of FIG. 7.

FIG. 14 demonstrates a section view and FIG. 15 shows a third zoomed-in view of the mobile device cover 700 of FIG. 7. These views feature the flexi 960 which is attached to an exposed portion of the glass layer 950.

In a non-limiting embodiment, the 3D glass window assembly can be fixed to cover mechanics of a mobile device. A long plastic sheet layer (compared to other layers) can be glued or taped to other mechanics. This "over-size" plastic layer can be shorter than the edge of the window-stack in some locations depending on the design of the mobile device (for example, to account for the locations of the buttons on the phone side).

Figure 18:
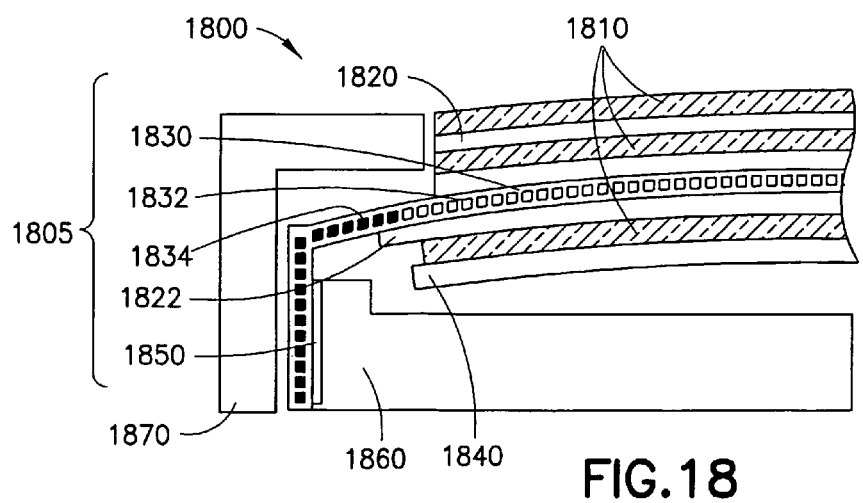
FIG. 18 illustrates a cut-away view of device which incorporates a fifth multilayer structure in accordance with an exemplary embodiment.

FIG. 18 illustrates a cut-away view of device 1800 which incorporates another multilayer structure 1805 in accordance with an exemplary embodiment similar to that shown in FIGS. 4 and 5. The multilayer structure 1805 is a stack of several layers of window glass 1810, OCA 1820, a touch sensitive film 1830, a second OCA 1822 and an OLED 1840. The touch sensitive film 1830 has a touch element portion 1834 and a film only portion 1832 (which does not include the touch element). The film only portion 1832 extends beyond the edges of the other layers (1810, 1820, 1822, 1840) in the multilayer structure 1805.

The film only portion 1832 of the touch sensitive film 1830 is attached to a chassis 1860 by a 2-sided adhesive 1850. This secures the multilayer structure 1805 to the other parts of the device 1800. A side trim 1870 covers the interior of the device where the film only portion 1832 of the touch sensitive film 1830 and chassis 1860 are located.

Figure 19:
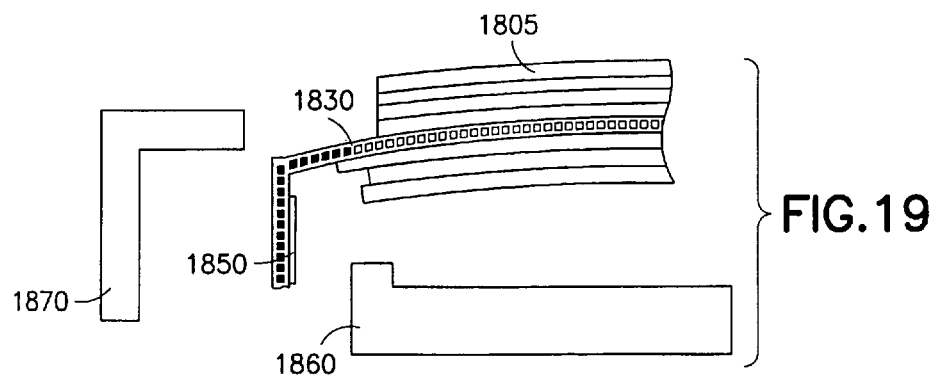
FIG. 19 illustrates an exploded view of the fifth multilayer structure of FIG. 18.

FIG. 19 illustrates an exploded view of the multilayer structure of FIG. 18. The touch sensitive film 1830 is shown extending from the edge of the multilayer structure 1805. The 2-sided adhesive 1850 is fixed to one side of the touch sensitive film 1830 in order to be adhered to chassis 1860.

In another embodiment, the 3D glass window can be attached to the mobile device cover using in-mold integration in order to have a seamless glass-cover structure. The flexible glass window/stack solves conventional problems of using a rigid 3D glass insert in an injection molding tool (where the dimensions of a rigid insert may vary which cause problems in the injection molding tool).

In contrast, a flexible insert is much better from a tolerance point of view. A long plastic layer may be used by the injection molding tool so that any hot mold surface is kept from contact with heat sensitive elements, for example, an OCA and/or electronics in the window/stack insert.

Figure 20:
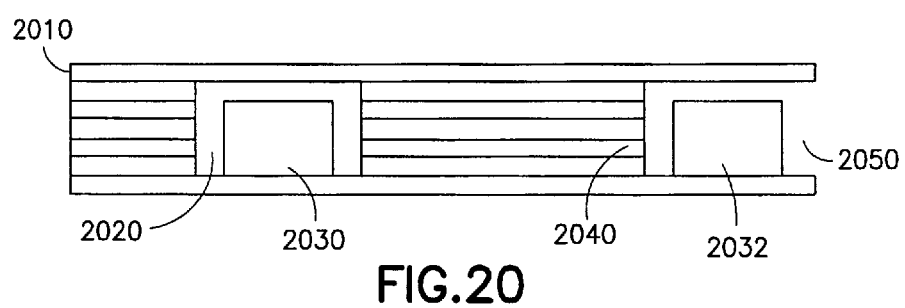
FIG. 20 illustrates a cut-away view of a multilayer structure in accordance with an exemplary embodiment.

In order to provide space for embedded components which may be thicker than a single layer one or more layers of the glass stack may be specifically formed to accommodate such components. FIG. 20 illustrates a cut-away view of a multilayer structure in accordance with an exemplary embodiment. A window laminate 2010 features layers which have holes 2020 in a subset of layers in order to provide room for additional components 2030. Some layers 2040 may be shorter than others so that additional components 2032 may fit in a cavity 2050 on an edge of the window laminate 2010.

Figure 21:
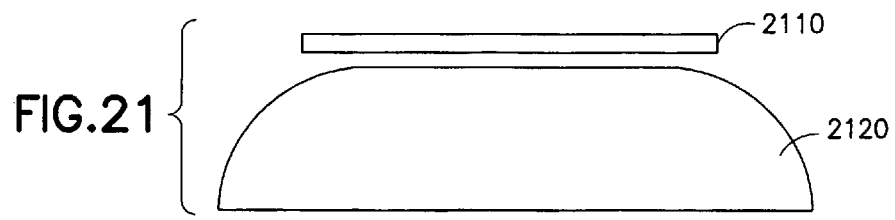
FIG. 21 illustrates a first stage in a manufacturing process in accordance with an exemplary embodiment.
Figure 22:
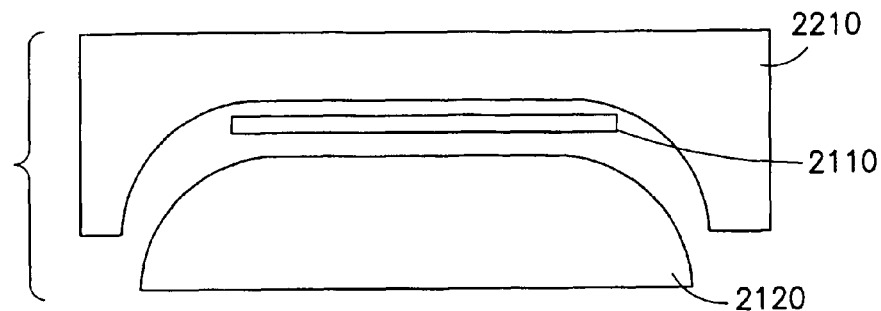
FIG. 22 illustrates a second stage in a manufacturing process in accordance with an exemplary embodiment.
Figure 23:
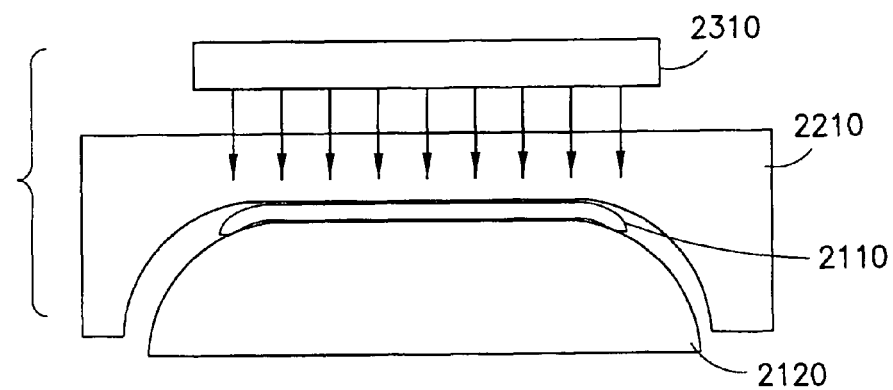
FIG. 23 illustrates a third stage in a manufacturing process in accordance with an exemplary embodiment.

FIG. 21 illustrates a first stage in a manufacturing process in accordance with an exemplary embodiment. A multilayer stack 2110 is placed on a mold 2120. The stack 2110 may be layered separately and then placed on the mold 2120 or individual layers in the stack 2110 may be placed on the mold 2120 to form the stack 2110. As illustrated in FIG. 22, a mold cover 2210 is placed over the stack 2110. The mold cover 2210 may add compressive force to the stack 2110 to ensure the stack 2110 correctly takes the 3D shape of the mold 2120. As illustrated in FIG. 23, at this lamination stage, an ultraviolet light source 2310 is used to set adhesives in the stack 2110. The mold cover 2210 is transparent to the ultraviolet light. Alternatively, the mold cover 2210 can focus the ultraviolet light onto the stack 2110. Additional lamination processes may be performed in order to separately set various layers. For example, additional layers may be added after a first lamination process and a second lamination process may be performed. All lamination processes may use the same techniques or different techniques may be used for each.

Figure 24:
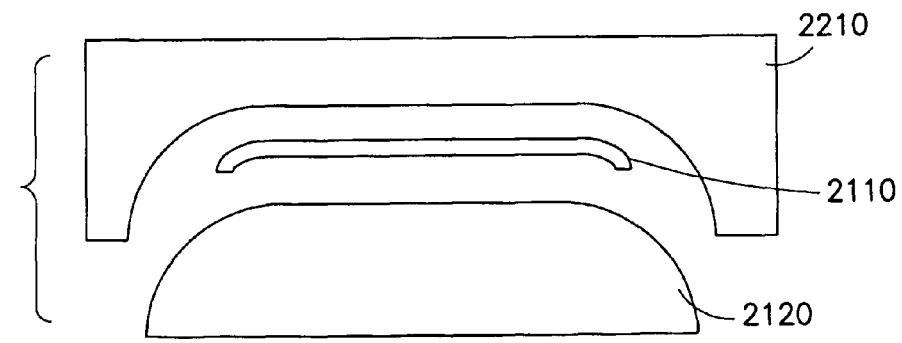
FIG. 24 illustrates a fourth stage in a manufacturing process in accordance with an exemplary embodiment.

As illustrated in FIG. 24, after the adhesive is set, the mold cover 2210 may be removed and the stack 2110 disconnected from the mold 2120. The stack 2110 now has the 3D shape imparted to it from the mold 2120.

In one non-limiting example, individual 3D glass windows may be made one at a time. In another non-limiting example, multiple 3D glass windows may be laminated in a composite sheet and then cut into separate windows. The arrangement of glass windows in the composite sheet is chosen so that elements which extend from the edge of other layers (for example, a plastic sheet and/or a flexi) are not cut when separating the glass window form the composite sheet.

In a further non-limiting example, the various layers in the stack 2110 may be laminated layer by layer. In this embodiment, various layers are laminated and then additional layers are added to the stack and the resulting stack laminated. The laminations processes used may be identical or they may be different. In another non-limiting example, multiple lamination processes may be used on the same stack in order to set various layers of OCA and/or glue. For example, a first OCA in the stack may be laminated used a first process and then a second OCA within the same stack may be laminated using a second, different process.

As discussed above, thermoforming or molding of 3D glass window is very difficult. For example, the process may be inefficient and operate with a low yield which can cause high costs. The resulting 3D glass window may also be unsuitable for modern devices. The window is thick (up to 0.8 mm) and has a poor drop durability (tending to crack or break). In order to correct the durability a separate antisplinter film may be used (increasing the overall thickness and manufacturing costs). Additionally, the glass window may have a low optical quality due to distortions in the glass material caused by thermoforming. There are also the issues of determining how to laminate elements to the 3D glass window and how to fix the glass window to device mechanics.

The manufacturing capacity of heat bent glass is limited by the processes used. Bending glass with heat is very time consuming and, due to unpredictable behavior of soft glass, the yield can be as low as 30%. This causes manufacturing risks and a low yield that drive up the price of making bent glass. Additionally, the process may use a large number of tools, as many as 42, to set up a special production line. These tools are used e.g. in a circular conveyor heating oven in a continuous process. Alternatively, multiple ovens may be used to enable mass production. In contrast, lamination of a solid glass sheet is a very fast process which lends itself to mass production.

The glass in heat bending gets thinner during the bending because the glass has to stretch. This stretching also causes optical distortions. However, in an exemplary embodiment, the glass sheets are cold laminated (laminated at temperatures that do not distort the glass) so that the wall thickness of the glass sheets remains the same throughout the lamination process. This avoids stretching and preserves the optical quality of the glass sheets.

A solid glass sheet in the conventional techniques is recommended to have a thickness of 0.8 mm. The addition of an antisplinter film to further protect the glass adds additional thickness. Similarly, a touch screen and other elements further increase the thickness.

An exemplary embodiment uses thin glass sheets (for example, with a thickness of 0.2 mm). The glue between the individual sheets provides a similar antisplinter function without increasing the thickness of the total stack. When a soft glue is used, the sheets can move relative to each other to a minor degree. This provides further damage resistance to the stack. Thus, the costs are reduced as a separate antisplinter film (and lamination) is not necessary.

An exemplary embodiment performs lamination of the touch-sensor when setting the 3D shape of the stack. Thus, the touch-sensor may be embedded in a flexible glass film using techniques for 2D forms. In contrast, lamination of the touch-sensor to a 3D glass, while possible, is limited by the yield of the process which is lower than for 2D lamination. Thus, various exemplary embodiments avoid the added risks and burden of 3D lamination of a touch-sensor (as well as the added thickness).

Conventional techniques may include the use of plastic in the window, for example, using in-mold labeling (IML) and in-mold decorating (IMD). However, plastic has a lower visual quality than glass. Additionally, glass has a better scratch resistance. Accordingly, plastic windows are insufficient replacements for glass windows in many applications.

An exemplary embodiment provides a method of making a multilayer three dimensional (3D) screen which includes glass. Each layer of the screen is thin. When a film of glass is thin (for example, less than 0.2 mm), the glass is flexible. By stacking multiple thin films in layers, the screen may be provided a degree of flexibility. This flexibility is produced since the individual layers may slide in relation to each other when the stack is bent or shaped. Thus, the stack can then be molded into a desired 3D shape and processed to set the form. This provides a means to manufacture 3D glass screens which avoids the inherent hurdles of thermoforming.

Figure 26:
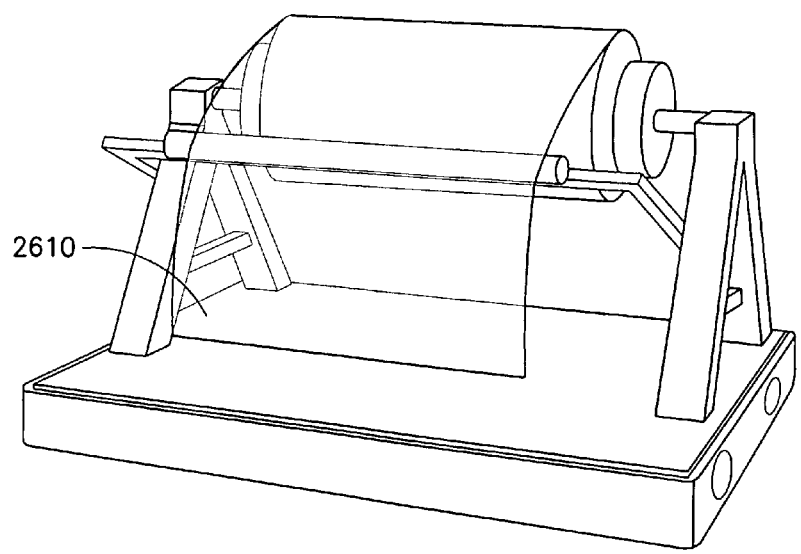
FIG. 26 shows a roll of ultra-thin glass as may be used in an exemplary embodiment.

FIG. 26 shows a roll of ultra-thin glass as may be used in an exemplary embodiment. Since the glass sheet 2610 is thin, it is flexible enough to be rolled onto a cylinder.

The stack of layers/films may provide a degree of durability to the final 3D glass window. For example, the layers may slide in relation to each other when the device is dropped in order to avoid cracking or shattering; which may otherwise occur to a solid sheet of glass.

Prior to stacking and laminating, the individual layers may be pre-processed to include functional elements. Functional elements are those which provide some functionality such as, antenna patterns, decorative elements and embedded electronics for example. Since there are several layers, this allows multiple functional elements to be added to the glass screen. The process to set the shape of the multilayer 3D glass screen may be selected so that the functional elements are not damaged during the setting process. This allows the functional elements to be applied to 2D films and then molded and set in a 3D form.

Various exemplary embodiments also provide a multilayered 3D structure of thin glass with embedded functionalities. Each ultra-thin 2D (flat) glass sheet is separately prepared before bending (such as along with optically clear adhesive (OCA) and/or glue for example) to final 3D window shape. The lamination process sets the 3D window shape.

The bent 3D glass window is made up of several layers and functions may be embedded within the wall thickness on different surfaces on each layer. Additional elements can be easily made onto a 2D (flat) glass sheet prior to final assembly. These elements include printed decorations, antenna patterns, mechanical features, a touch sensor, a light emitting diode (LED), resistors, other printed electrical components, etc., for example, and may be applied using indium tin oxide (ITO), fine line metal technologies, etc. The top surface glass sheet, as well as any glass sheet in stack, can be hardened and a functional coating such as an easy to clean (E2C) coating and/or an anti-reflective coating (AR) can be added. Since the 3D glass window is made in several layers without heating the glass, functional elements may be embedded within the wall thickness of the glass layers without fear that the lamination process will destroy those elements.

Based on the foregoing it should be apparent that various exemplary embodiments provide a method to manufacturing of thin 3D glass window.

Figure 25:
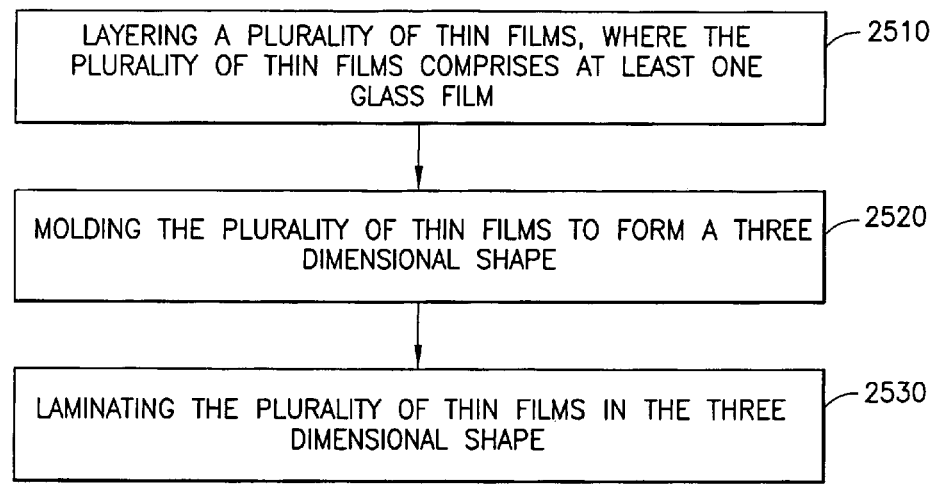
FIG. 25 is a logic flow diagram that illustrates the operation of an exemplary method, and a result of execution of computer program instructions embodied on a computer readable memory, in accordance with various exemplary embodiments.

FIG. 25 is a logic flow diagram that illustrates the operation of a method, and a result of execution of computer program instructions, in accordance with exemplary embodiments. In accordance with these exemplary embodiments a method performs, at Block 2510, a step of layering a plurality of thin films. The plurality of thin films comprises at least one glass film. At Block 2520, the method performed a step of molding the plurality of thin films to form a three dimensional shape. A step of laminating the plurality of thin films in the three dimensional shape is performed by the method at Block 2530

The various blocks shown in FIG. 25 may be viewed as method steps, and/or as operations that result from operation of computer program code, and/or as a plurality of coupled logic circuit elements constructed to carry out the associated function(s), for example, using an automated manufacturing apparatus.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

An exemplary embodiment is a method for the manufacturing of thin 3D glass window. The method includes layering a plurality of thin films. The plurality of thin films includes at least one glass film. The method also includes molding (or otherwise shaping) the plurality of thin films to form a three dimensional shape and laminating the plurality of thin films in the three dimensional shape.

In a further exemplary embodiment of the method above, the at least one glass film includes at least one embedded functional element. The at least one embedded functional element may include a decoration, an antenna pattern, a touch sensor, printable electronics and/or at least one light emitting diode.

In another exemplary embodiment of any of the methods above, the at least one glass film comprises a resiliently flexible glass film.

In another exemplary embodiment of any of the methods above, the plurality of thin films includes a hardened glass film. The hardened glass film may include an anti-reflective coating and/or an easy to clean coating. The hardened glass film may be an outer film of the plurality of thin films.

In a further exemplary embodiment of the method above, the method also includes hardening any film of the plurality of thin films. Hardening may include chemical strengthening, tempered hardening and/or atomic layer deposition.

In another exemplary embodiment of any of the methods above, the method also includes post-processing (that is processing the stack after laminating) an outer film of the laminated plurality of thin films. Post-processing may include polishing the outer film to have a gloss finish, applying an anti-reflective coating and/or applying an easy to clean coating.

In a further exemplary embodiment of the method above, the plurality of thin films includes at least one of: an optical clear adhesive layer and a glue layer.

In another exemplary embodiment of any of the methods above, the plurality of thin films includes at least one layer of glue and where laminating the shaped plurality of thin films includes curing the at least one layer of glue using ultraviolet light.

In a further exemplary embodiment of the method above, laminating the shaped plurality of thin films includes performing a cold lamination of the shaped plurality of thin films.

In another exemplary embodiment of any of the methods above, the method also includes stacking the plurality of thin films on an organic light emitting diode layer.

In a further exemplary embodiment of the method above, molding the plurality of thin films includes stacking the plurality of thin films on one of: a three dimensionally shaped mold and a curved lamination jig.

In another exemplary embodiment of any of the methods above, the method also includes attaching the laminated plurality of thin films to a housing. The laminated plurality of thin films may be attached to the housing glue, a two-sided adhesive and/or at least one mechanical fixture.

In a further exemplary embodiment of the method above, the plurality of thin films includes a plastic sheet. The plastic sheet may include a screw boss, a hole and/or snappers. A portion of the plastic sheet may extend beyond the edge of other thin films in the plurality of thin films. The method may also include attaching the portion of the plastic sheet to a housing.

In another exemplary embodiment of any of the methods above, at least one thin film in the plurality of thin films includes a flexible connector. The flexible connector may be an anistopic conductive film bonded to the at least one thin film. The flexible connector may also include a pogo pin, a spring clip, a soldered cable connection and/or an inductive coupling connection.

A further exemplary embodiment is an apparatus including a thin 3D glass window. The apparatus includes a laminated plurality of thin films. The laminated plurality of thin films includes at least one glass film. The laminated plurality of thin films has a three dimensional form.

In another exemplary embodiment of the apparatus above, the at least one glass film includes at least one embedded functional element. The at least one embedded functional element may include a decoration, an antenna pattern, a touch sensor, printable electronics and/or at least one light emitting diode.

In a further exemplary embodiment of the apparatus above, the at least one glass film comprises a resiliently flexible glass film.

In a further exemplary embodiment of the apparatus above, the laminated plurality of thin films includes a hardened glass film. The hardened glass film may include an anti-reflective coating and/or an easy to clean coating. The hardened glass film may be an outer film of the laminated plurality of thin films.

In another exemplary embodiment of any of the apparatus above, the laminated plurality of thin films includes an optical clear adhesive layer and/or a glue layer.

In a further exemplary embodiment of any of the apparatus above, the apparatus also includes an organic light emitting diode layer, where the laminated plurality of thin films are stacked on the organic light emitting diode layer.

In another exemplary embodiment of any of the apparatus above, the apparatus also includes a housing. The laminated plurality of thin films may be attached to the housing glue, a two-sided adhesive and/or at least one mechanical fixture.

In a further exemplary embodiment of any of the apparatus above, where the laminated plurality of thin films includes a plastic sheet. The plastic sheet may include a screw boss, a hole and/or snappers. A portion of the plastic sheet may extend beyond the edge of other thin films in the laminated plurality of thin films.

In another exemplary embodiment of any of the apparatus above, at least one thin film in the laminated plurality of thin films includes a flexible connector. The flexible connector may be an anistopic conductive film bonded to the at least one thin film. The flexible connector may include a pogo pin, a spring clip, a soldered cable connection and/or an inductive coupling connection.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

What is claimed is:

1. An apparatus comprising:
a laminated plurality of films, where the laminated plurality of films comprises at least one glass film, where the laminated plurality of films has a non-planar three dimensional form, where at least one of the films includes a hole that allows access to another of the films or access to an embedded component, and where the laminated plurality of films comprises at least one of: an optical clear adhesive layer and a glue layer.

2. The apparatus of claim 1, where the at least one glass film comprises at least one embedded functional element.

3. The apparatus of claim 1, where the laminated plurality of films comprises a hardened glass film.

4. The apparatus of claim 1, further comprising an organic light emitting diode layer, where the laminated plurality of films are stacked on the organic light emitting diode layer.

5. The apparatus of claim 1, further comprising a housing.

6. The apparatus of claim 1, where the laminated plurality of films comprises a plastic sheet.

7. The apparatus of claim 6, where the plastic sheet comprises at least one of a screw boss, a hole, and snappers.

8. The apparatus of claim 1, where at least one glass film in the laminated plurality of films comprises a connector that is sufficiently flexible such that the plurality of films can be rolled into a cylinder.

9. The apparatus of claim 8, where the connector is anisotropic conductive film bonded to the at least one glass film.

10. An apparatus, comprising:
    a laminated plurality of films, where the laminated plurality of films comprises at least one glass film having a thickness of 0.2 mm or less, where the laminated plurality of films has a non-planar three dimensional form, and where at least one of the films includes a hole that allows access to another of the films or access to an embedded component.

11. The apparatus of claim 10, where the at least one glass film comprises at least one embedded functional element.

12. The apparatus of claim 10, where the laminated plurality of films comprises a hardened glass film.

13. The apparatus of claim 10, where the laminated plurality of films comprises a plastic sheet.

14. The apparatus of claim 13, where the plastic sheet comprises at least one of a screw boss, a hole, and snappers.

15. An apparatus, comprising:
    a laminated plurality of films, where the laminated plurality of films comprises at least one thin glass film, wherein the thin glass film is 0.2 mm or less, where the laminated plurality of films has a non-planar three dimensional form, and where at least one of the films includes a hole that allows access to another of the films or access to an embedded component.

16. The apparatus of claim 15, where the at least one glass film comprises at least one embedded functional element.

17. The apparatus of claim 15, where the laminated plurality of films comprises a plastic sheet.

18. The apparatus of claim 17, where the plastic sheet comprises at least one of a screw boss, a hole, and snappers.

19. The apparatus of claim 15, where the hole allows access to a printed antenna pattern.

\* \* \* \* \*